(12) United States Patent
Wei et al.

(10) Patent No.: US 8,137,572 B2
(45) Date of Patent: Mar. 20, 2012

(54) REFLECTIVE PLANAR LIGHTWAVE CIRCUIT WAVEGUIDE

(75) Inventors: HongZhen Wei, Fremont, CA (US); Ray Liang, Saratoga, CA (US); Wenhua Lin, Fremont, CA (US); Ted Chen, Saratoga, CA (US); Jacob Sun, Saratoga, CA (US)

(73) Assignee: Enablence USA Components Inc., Fremont, CA (US)

( * ) Notice: Subject to any disclaimer, the term of this patent is extended or adjusted under 35 U.S.C. 154(b) by 355 days.

(21) Appl. No.: 12/577,676

(22) Filed: Oct. 12, 2009

(65) Prior Publication Data
US 2010/0025361 A1 Feb. 4, 2010

Related U.S. Application Data

(62) Division of application No. 12/199,655, filed on Aug. 27, 2008, now Pat. No. 7,933,478.

(60) Provisional application No. 61/067,150, filed on Feb. 25, 2008.

(51) Int. Cl.
*B29D 11/00* (2006.01)

(52) U.S. Cl. .................. 216/24; 216/2; 216/83; 385/14; 385/37

(58) Field of Classification Search ................ 216/2, 24, 216/83; 385/14, 37
See application file for complete search history.

(56) References Cited

U.S. PATENT DOCUMENTS

| | | | |
|---|---|---|---|
| 6,567,590 B1 | 5/2003 | Okada et al. | |
| 6,714,696 B2 | 3/2004 | Kishimoto et al. | |
| 6,983,091 B2 | 1/2006 | Grunnet-Jepsen et al. | |
| 7,343,060 B2 * | 3/2008 | Ohtsu et al. | 385/14 |
| 2004/0017962 A1 * | 1/2004 | Lee et al. | 385/14 |
| 2007/0086712 A1 | 4/2007 | Shani | |

* cited by examiner

*Primary Examiner* — Shamim Ahmed
(74) *Attorney, Agent, or Firm* — Innovation Counsel LLP

(57) ABSTRACT

A method of making a planar lightwave circuit (PLC) waveguide capable of being integrated with a surface-mounted component is presented. The method entails etching a silicon substrate to form a slanted wall, forming a nonreflective waveguide portion on the silicon substrate, and depositing a reflective layer on the slanted wall. Light travels through the nonreflective waveguide portion in substantially a first direction, and the light from the nonreflective waveguide portion strikes the reflective layer to be redirected in a second direction. The second direction may be the direction toward the surface-mounted component. A PLC waveguide device made with the above method is also presented.

49 Claims, 16 Drawing Sheets

REFLECTIVE PLANAR LIGHTWAVE CIRCUIT WAVEGUIDE

CROSS-REFERENCE TO RELATED APPLICATION(S)

This application is a divisional application of U.S. patent application Ser. No. 12/199,655 filed on Aug. 27, 2008, U.S. Pat. No. 7,933,478 which claims the benefit of U.S. Provisional Patent Application No. 61/067,150 filed on Feb. 25, 2008, the contents of which are incorporated by reference herein.

BACKGROUND

1. Field of Technology

The invention relates generally to optical waveguides and particularly to optical coupling of a silica-based waveguide and a surface-mount device.

2. Related Art

Optical waveguide devices formed on planar substrates have become important elements for various optical network applications such as multiplexers and demultiplexers in dense wavelength division multiplexing (DWDM) systems and components in passive optical networks (PON). In the field of optical communications, use of monolithic silica-based planar lightwave circuits (PLCs) with optical passive devices is well known. FIG. 1 is a cross-sectional view of an optical waveguide device 1 formed on a planar substrate 10. On the planar substrate 10, there are a lower cladding layer 12, a core layer 14, and an upper cladding layer 16. These layers may be made of pure or doped silicon dioxide ($SiO_2$). Light travels through the core layer 14.

With new developments in optical communication technologies, there is an increasing need for integration of optical, optoelectronic (e.g., laser diodes and photodiodes), and electronic components using low-cost passive alignment techniques to develop high functionality optoelectronics modules such as TOSA and ROSA. It is desirable to combine the low-cost silica PLC platform with an active device such as a laser diode or a photodiode to make a high-functionality optoelectronic module. This integration is difficult, however, because laser diodes and photodiodes are frequently made with III-V semiconductor substrates while PLCs are usually made with silicon substrates. While it is possible to make the PLC devices with III-V materials, this would make the integrated system expensive because III-V materials are more expensive than silicon.

The challenge in integrating the silica-based PLC with III-V-based active device lies in the interface. This challenge sometimes stems from the active device being a surface-mount device. Photodiodes, for example, are often surface-mount devices. To provide an effective interface, a method has been proposed whereby a micromirror using a silica-based PLC is used for optical path conversion. In this proposal, the micromirror is made of a resin by utilizing wettability control and surface tension effect. A well is first etched in the PLC and then the surface of a different area of the well is treated to make the contact angle of the resin on the surface different. The resin is put in the well by surface tension effect to form a mirror in the well. The mirror angle is controlled by the contact angles.

A problem with the above approach is that aside from the mirror groove, two termination grooves and a long resin supply groove are used to form the mirror. This increases the size of the mirror area. Also, the resin supply groove extends to the edge of the chip, making a deep groove along the chip. This deep groove along the chip may pose a problem for making electrode contact with the surface-mounted active device. This long groove may also affect the layout of the PLC waveguide.

A second approach is to fabricate an integrated mirror in a silica-based PLC. In this approach, a superficial layer is created by treating the surface in an oxygen plasma. During this treatment, the waveguide surface made of silica is subjected to intense ion bombardment by oxygen ions with an average energy of about 300 eV. Following this treatment, a layer of amorphous silicon is deposited as a hard mask. Then, chemical etching is carried out in a buffered (15%) hydrofluoric acid solution. Since the superficial layer etching rate is higher than the isotropic etching rate, a slope is formed in/on the waveguide. After depositing the aluminum as reflecting layer, a mirror is formed.

A problem with the second approach is that the mirror is formed by different etching rates in the surface-treated layer and the normal layer in isotropic etching. Because the surface-treated layer is usually shallow due to the limitations with ion bombardment, the mirror is usually short and covers a small part of the waveguide core layer. The small mirror size means only part of the waveguide mode is reflected, limiting the reflecting efficiency.

SUMMARY

In one aspect, the invention is a method of making a planar lightwave circuit (PLC) waveguide capable of being integrated with a surface-mounted component. The method entails etching a silicon substrate to form a slanted wall, forming a nonreflective waveguide portion on the silicon substrate, and depositing a reflective layer on the slanted wall. Light travels through the nonreflective waveguide portion in substantially a first direction, and the light from the nonreflective waveguide portion strikes the reflective layer to be redirected in a second direction. The second direction may be the direction toward the surface-mounted component.

In another aspect, the invention is a planar lightwave circuit (PLC) waveguide capable of being integrated with a surface-mounted component. The PLC waveguide includes a silicon substrate having a sidewall formed in an inner area away from edges of the silicon substrate, a nonreflective waveguide portion formed on the silicon substrate, and a reflective layer formed on the slanted wall. Light travels through the nonreflective waveguide portion in substantially a first direction. Light from the nonreflective waveguide portion strikes the reflective layer to be redirected in substantially a second direction, the second direction being substantially perpendicular to the first direction.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

It will be understood that when an element or layer is referred to as being "on" another element or layer, it can be directly on the other element or layer or intervening elements or layers may be present. In contrast, when an element is referred to as being "directly on" another element or layer, there are no intervening elements or layers present.

This invention includes a low-cost monolithic integrated mirror made with a silica-base PLC technology that is capable of interfacing a surface-mounted component, even a surface-mounted III-V component. The monolithic integration is cost efficient, highly reliable, and suitable for large-scale production. For planar active devices such as surface-emitting laser diodes and photodiodes, the key component is a monolithic integrated mirror that can reflect light traveling in a horizontal direction (i.e., parallel to the board) to redirect it in a vertical direction (i.e., orthogonal to the board). This way, the light can be coupled to an active device mounted on a surface.

Figure 1:
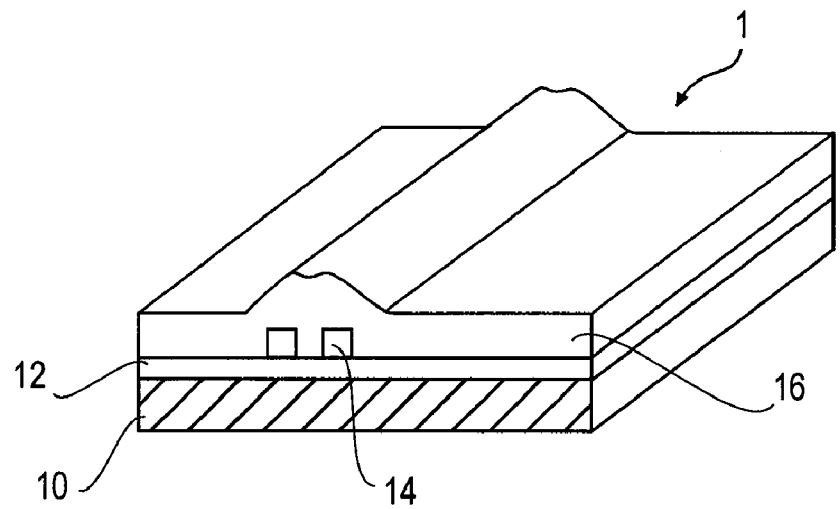
FIG. 1 is a cross-sectional view of an optical waveguide device formed on a planar substrate.
Figure 2A:
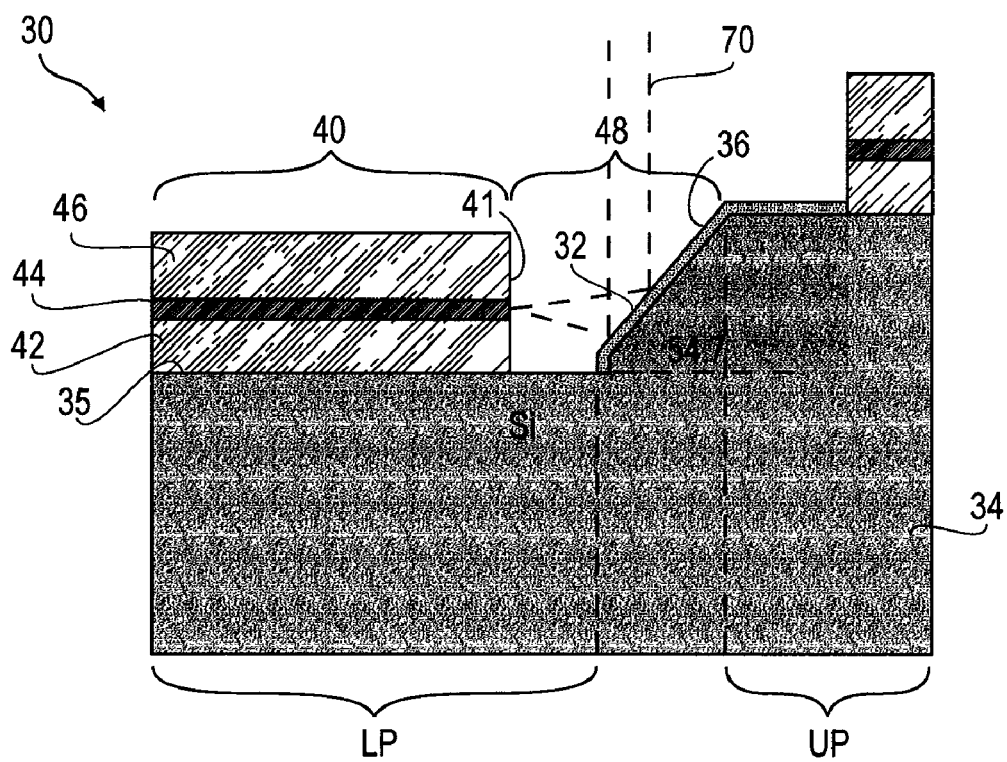
FIG. 2A is a cross-sectional view of an embodiment of the PLC waveguide of the invention.

FIG. 2A is a cross-sectional view of a reflective PLC waveguide 30 having a slanted wall 32. As shown, the PLC waveguide 30 has a silicon substrate 34 that is partially etched to form a slanted wall 32. In forming the slanted wall 32, a lower portion LP and an upper portion UP are formed on the silicon substrate 34, with the slanted wall 32 positioned between the lower portion LP and the upper portion UP. The reflective layer 36 forms an angle of about 20° to 70° with respect to the horizontal surface 35 of the substrate 34. The slanted wall 32 forms an angle of about 20° to about 70° with respect to a horizontal surface 35 of the substrate 34; for example, the slanted wall 32 may form an angle of about 54.7° with respect to the horizontal surface 35 of the substrate 34. In some embodiments (e.g., the embodiments shown in FIGS. 2A, 3, 10A, and 10B), the reflective layer 36 has a substantially similar angle as the slanted wall 32 with respect to the horizontal surface 35. The PLC waveguide 30 is monolithic.

After the slanted wall 32 is formed, a nonreflective waveguide portion 40 is formed. Light 70 travels through the nonreflective waveguide portion 40 substantially in a first direction (a horizontal direction with respect to the figure), propagates across a gap 48 between the nonreflective waveguide portion 40 and the slanted wall 32, and reaches a reflective layer 36 that is coated on the slanted wall 32. The gap 48 may be filled with air, although this is not a limitation of the invention. The reflective layer 36 redirects the light 70 substantially in a second direction (a vertical direction with respect to the figure). In this particular embodiment, the reflective layer 36 is formed directly on the silicon substrate 34. The height of the slanted wall 32 is selected to make the far field mode of the nonreflective waveguide portion 40 locate at the linear area of the reflective layer 36.

The nonreflective waveguide portion 40 includes a bottom cladding layer 42, a core layer 44, and a top cladding layer 46. To form the nonreflective waveguide portion 40, the bottom cladding layer 42 is formed (e.g., deposited, thermally grown) on the surface of the silicon substrate 34 using a suitable method, preferably in a substantially constant thickness. The core layer 44 is then formed, followed by the top cladding layer 46, both in a substantially constant thickness. The cladding layers 42, 46 and the core layer 44 may all be made of $SiO_2$. Then, the part of the formed layers that cover the slanted wall 32 and its adjacent areas are removed, for example by etching (e.g., with $SF_6$), to expose the substrate surface. The reflective layer 36 is then formed. The shape and size of the reflective layer 36 may be adapted to the application as long as the light 70 strikes a flat surface of the reflective layer 36.

The nonreflective waveguide portion 40 has an exit facet 41 that interfaces the gap 48. In FIG. 2A, the exit facet 41 forms approximately a 90° angle with respect to the horizontal surface of the substrate 34. However, this is not a limitation of the invention, as will be explained below.

Figure 2B:
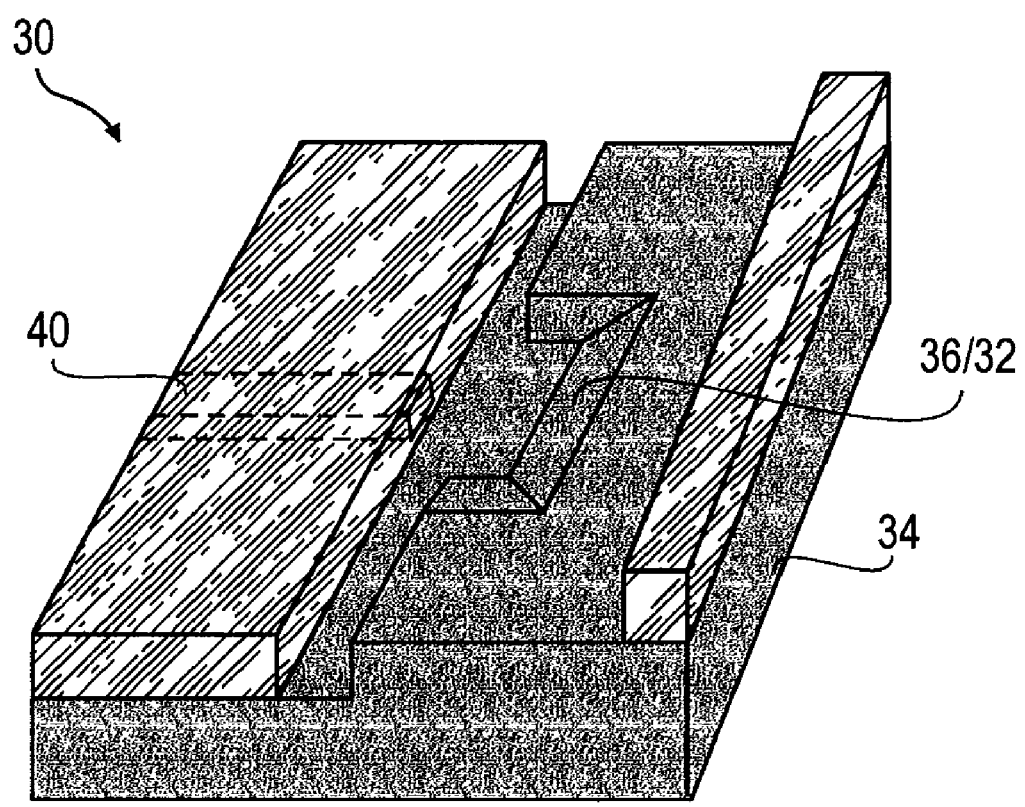
FIG. 2B is a perspective view of the embodiment of the PLC waveguide shown in FIG. 2A.

FIG. 2B is a perspective view of the PLC waveguide 30 of FIG. 2A. The core layer of the nonreflective waveguide portion 40 is shown by broken lines. To substantially keep the light traveling through the core layer, the core layer and the surrounding cladding layers have different doping concentrations. For example, the core layer may have a higher index of refraction than the surrounding cladding layer. As shown, the slanted wall 32 is a sidewall that is formed in the inner part of the chip, away from the edges of the chip. As shown in FIG. 2B, the slanted wall 32 is wider than the nonreflective waveguide portion 40 in plan view. For example, the width of the slanted wall may be about 100 µm or more, and the width of the nonreflective waveguide portion 40 may be about 1 µm or more. When viewed from the side, the thickness of the nonreflective waveguide portion 40 may be about 30~50 µm, while the slanted wall may be higher than 30 µm. Although these are typical dimensions for silica-on-silicon PLC, dimensions may be smaller for other silicon-based PLCs.

Figure 3:
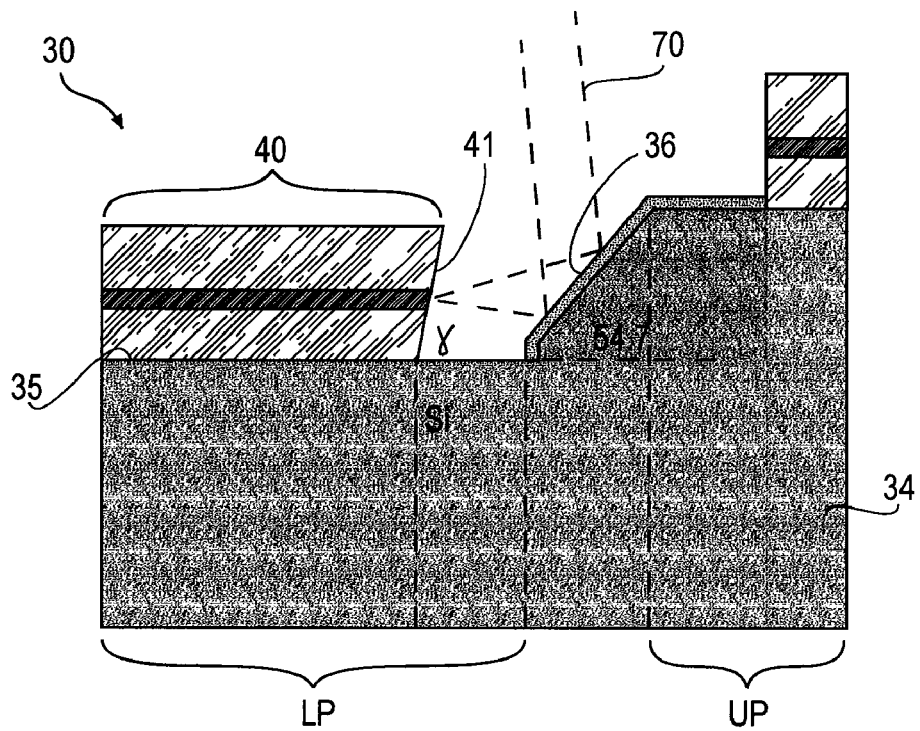
FIGS. 3-15 are views of different embodiments of the PLC waveguide of the invention.

FIG. 3 is a cross-sectional view of a second embodiment of the PLC waveguide 30. This embodiment is similar to the embodiment of FIG. 2, with a primary difference being that the exit facet 41 forms an angle γ with respect to the horizontal surface 35. Although the angle γ is less than 90° in this particular example, this is not a limitation of the invention. The angle γ of the exit facet 41 may be changed to control the direction in which light 70 travels after it exits the nonreflective waveguide portion 40, and is useful for controlling the point of incidence on the reflective layer 36.

The angle γ of the exit facet 41 may be created by etching. A person of ordinary skill in the art will understand how to adjust process variables such as plasma power and etchant composition to achieve the desired angle γ.

Figure 4:
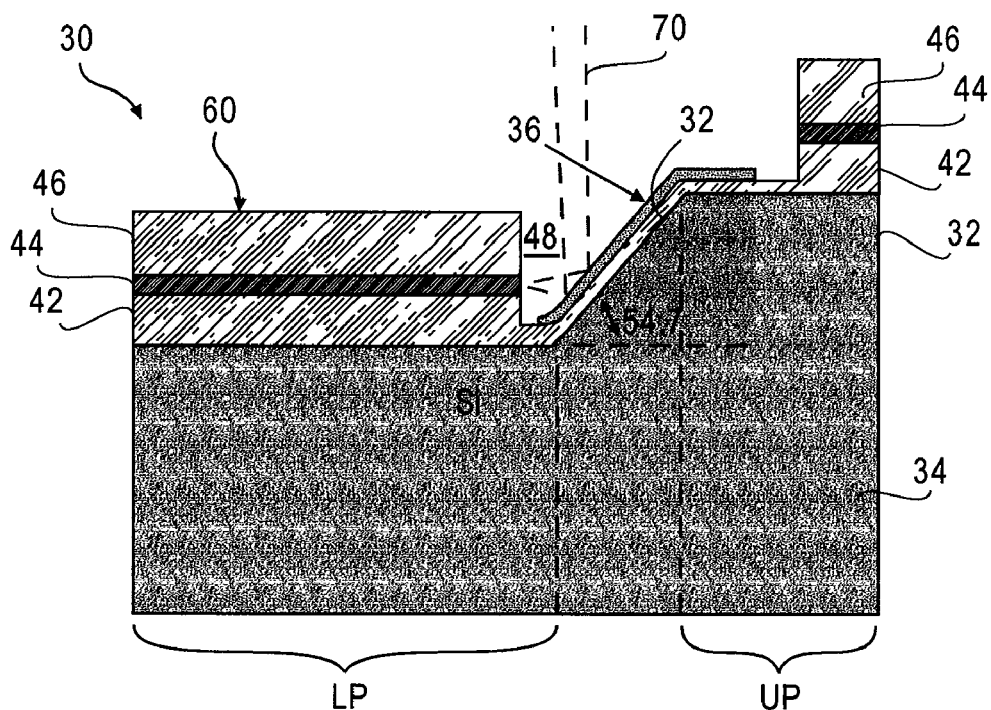

FIG. 4 is a cross-sectional view of a third embodiment of the PLC waveguide 30. This embodiment is similar to the embodiment of FIG. 2, with a primary difference being the existence of a thin bottom cladding layer 42 on the slanted wall 32. As shown, the reflective layer 36 is formed on the bottom cladding layer 42.

To make this embodiment, the substrate 34 is partially etched to form the slanted wall 32, the lower portion LP, and the upper portion UP. The bottom cladding layer 42, the core layer 44, and the upper cladding layer 46 are conformally formed on the substrate 34. The layers are then partially etched. In the particular example that is depicted, some of the bottom cladding layer 42 is left unetched on the lower portion LP and the upper portion UP. Due to this partial removal, the bottom cladding layer 42 is thinner on slanted wall 32 and the area of the upper portion UP that is adjacent to the slanted wall 32 than on the other parts of the substrate 34. The height of the slanted wall 32 may be controlled to make the waveguide far field mode locate at the desired area of the reflective layer 36. The depth to which the cladding layers are etched is at least partly determined by how to make the waveguide far field mode locate at the linear area of the reflective layer.

Unlike the embodiments shown in FIGS. 2A, 3, 10A, and 10B, the reflective layer 36 and the slanted wall 32 may have different angles in the embodiment of FIG. 4. This may also be the case in the embodiments shown in FIGS. 4-9 and 11, 12A, 12B, 12C, 13A, 13B, 14A, and 15 below.

Figure 5:
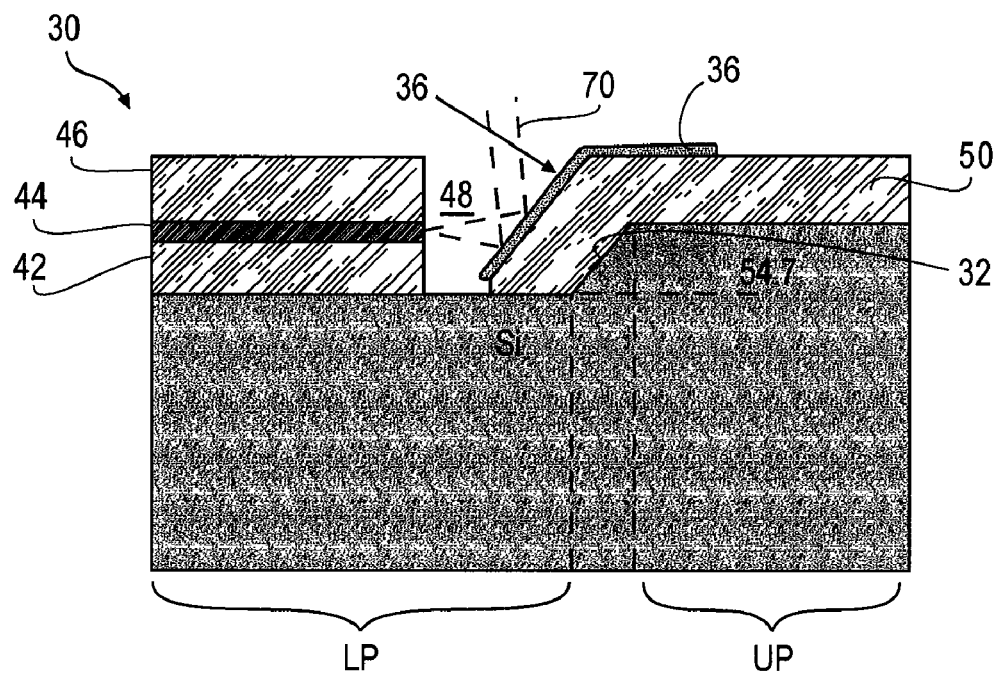

FIG. 5 is a cross-sectional view of a fourth embodiment of the PLC waveguide 30. This embodiment is substantially similar to the embodiment of FIG. 2, with a primary difference being that a cladding layer 50 is formed on the slanted wall 32. The cladding layer 50, which may be made of $SiO_2$, is formed on the slanted portion of the slanted wall 32 and also on the upper portion UP. The cladding layer 50 may be formed at the same time as the top cladding layer 46 and/or the bottom cladding layer 42. The reflective layer 36 is formed on the cladding layer 50. The reflective layer 36 is at about the same height level as the nonreflective waveguide portion 40.

The embodiment of FIG. 5 may be made by forming the bottom cladding layer 42 and the core layer 44, etching the layers from the upper portion UP, the slanted wall 32, and the part of the lower portion LP that is adjacent to the slanted wall 32. Then, the top cladding layer 46 is formed and partially etched to form the deepest part of the gap 48. The reflective layer 36 is then formed on top of the top cladding layer 46 (which is shown as the cladding layer 50). The top cladding layer 46 in the reflective portion of the PLC waveguide 30 may be etched partially to make the far field mode of the nonreflective waveguide portion 40 locate at the linear part of the mirror.

Alternatively, after forming the bottom cladding layer 42 and the core layer 44, the top cladding layer 46 may be formed to prepare the nonreflective waveguide portion 40. Then, the top cladding layer 46 and the core layer 44 are etched completely or partially to make the far field mode of the nonreflective waveguide portion 40 locate at the linear part of the mirror.

Figure 6:
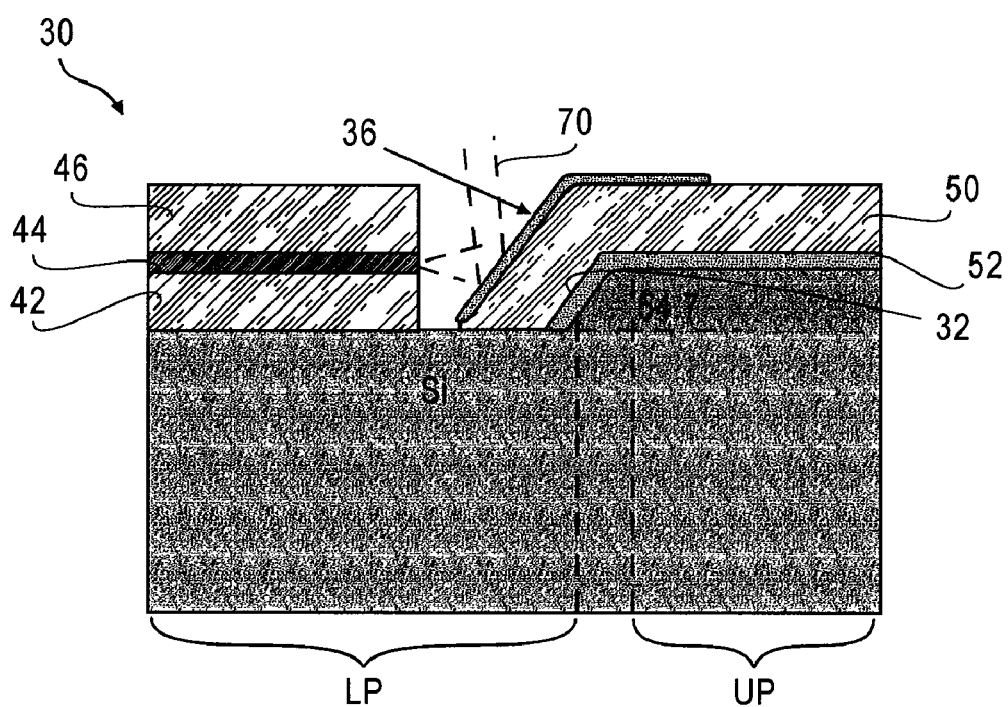

FIG. 6 is a cross-sectional view of a fifth embodiment of the PLC waveguide 30. This embodiment is similar to the embodiment of FIG. 5, with a primary difference being the existence of an α-Si layer 52. After forming the core layer 44, it is desirable for the top surface of the core layer 44 to be at approximately the same level as the top surface of the slanted wall 32 so that there would be no gap between the contact mask and the waveguide surface during lithography. In the embodiment of FIG. 5, the light 70 might strike the reflective layer 36 close to or at the rounded areas instead of at the linear area. By forming the α-Si layer 52 conformally after forming the core layer 44, then forming the top cladding layer 46 and partially/completely (completely, in the case of FIG. 6) etching the top cladding layer 46, the linearity of the effective reflective surface can be increased. As shown, the α-Si layer 52 is formed directly on the silicon substrate 34, between the silicon substrate 34 and the cladding layer 50. The thickness of the α-Si layer 52 is controlled to ensure that the reflective coating 36 covers all the far field mode of the PLC waveguide 30. The α-Si layer 52 may be substituted with a SiN layer.

To form the embodiment of FIG. 6, a temporary layer (not shown) is formed on the substrate 34 and selectively removed from the nonreflective waveguide portion 40. On the slanted wall 32 and the upper portion UP, the temporary layer may be a SiN layer. Where the bottom cladding layer 42 is formed, the temporary layer may be a photoresist layer or an SiN layer. If the bottom cladding layer 42 is thermally grown, then a locos process may be used. Then, the α-Si layer 52 is formed and patterened on the slanted wall. The core layer 44 is formed, and selectively removed along with the bottom cladding layer 42 from the desired areas. The top cladding layer 46 is formed, part of which forms the cladding layer 50. The cladding layer 50 is then selectively removed to form the deepest portion of the gap 48. The reflective layer 36 is formed and selectively removed.

Figure 7:
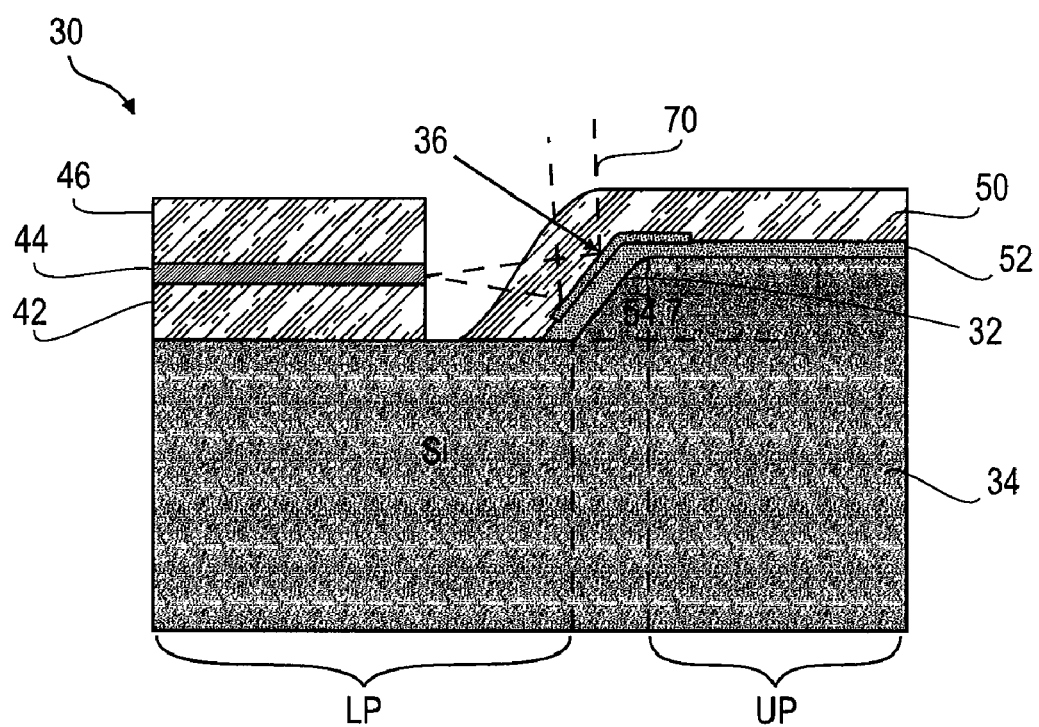

FIG. 7 is a cross-sectional view of a fourth embodiment of the PLC waveguide 30. This embodiment is similar to the embodiment of FIG. 6, with a primary difference being the position of the reflective layer 36. Unlike in the embodiment of FIG. 6, the reflective layer 36 is positioned directly on the α-Si layer 52, between the α-Si layer 52 and the cladding layer 50.

The embodiment of FIG. 7 is made using a process that is similar to the process for FIG. 6. However, to change the location of the reflective layer 36, the reflective layer 36 is formed after the formation of the α-Si layer 52 and before the formation of the cladding layer 50.

Figure 8:
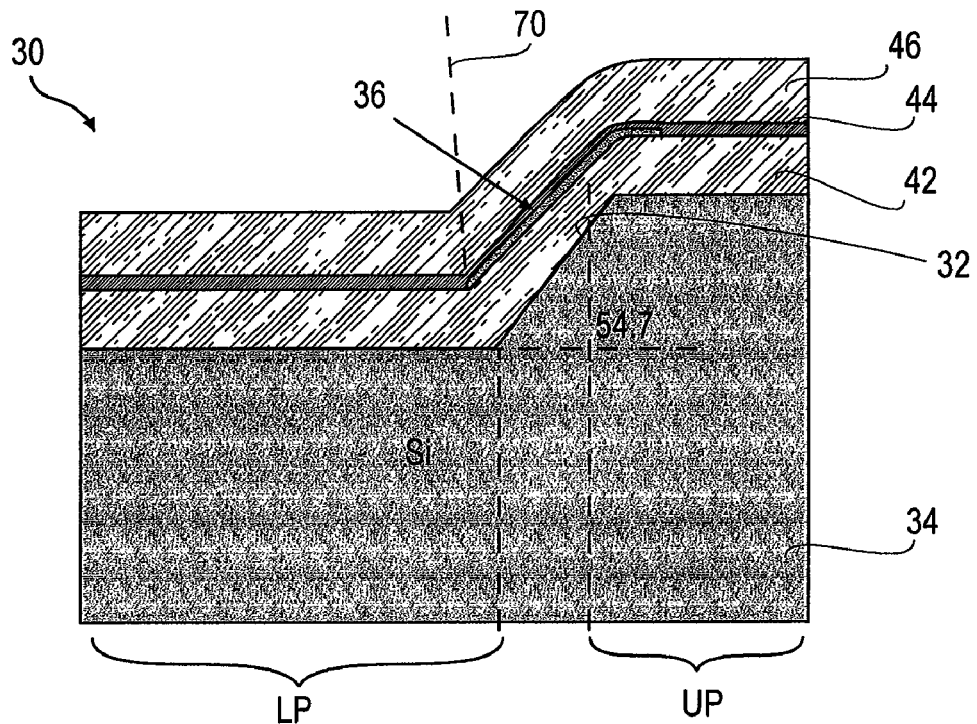

FIG. 8 is a cross-sectional view of a seventh embodiment of the PLC waveguide 30. In this embodiment, which has no gap 48, the reflective layer 36 is formed between the bottom cladding layer 42 and the core layer 44 on the slanted wall 32. The light 70 travels through the core layer 44 in the lower portion LP, then strikes the lower part of the reflective layer 36 to get reflected upward, as shown.

To make this seventh embodiment, the substrate 34 is etched to form the slanted wall of a desired angle, the bottom cladding layer 42 is formed, and a reflective layer is formed on the bottom cladding layer 42. The reflective layer is removed everywhere except for an area including the slanted wall 32, and the core layer 44 is formed. Then, the top cladding layer 46 is formed on the core layer 44. Each layer is formed to have a substantially constant thickness. Here, the top cladding layer 46 provides protection to the reflective layer 36.

Figure 9:
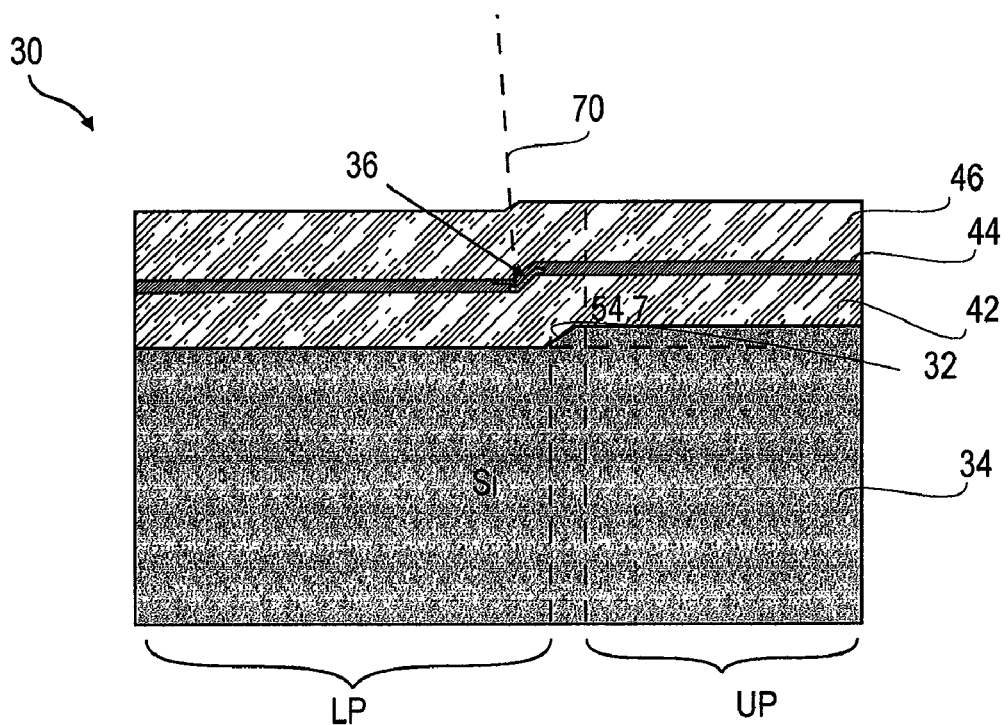

FIG. 9 is a cross-sectional view of an eighth embodiment of the PLC waveguide 30. This embodiment is similar to the embodiment of FIG. 8, with a primary difference being that the slanted wall 32 is shorter. When the slanted wall 32 is short enough, the top surface of the top cladding layer 46 becomes substantially flat. To flatten the top surface, the top cladding layer 46 covering the reflective layer 36 may be etched partially or completely. This embodiment is made using the same process as the embodiment of FIG. 8.

Figure 10A:
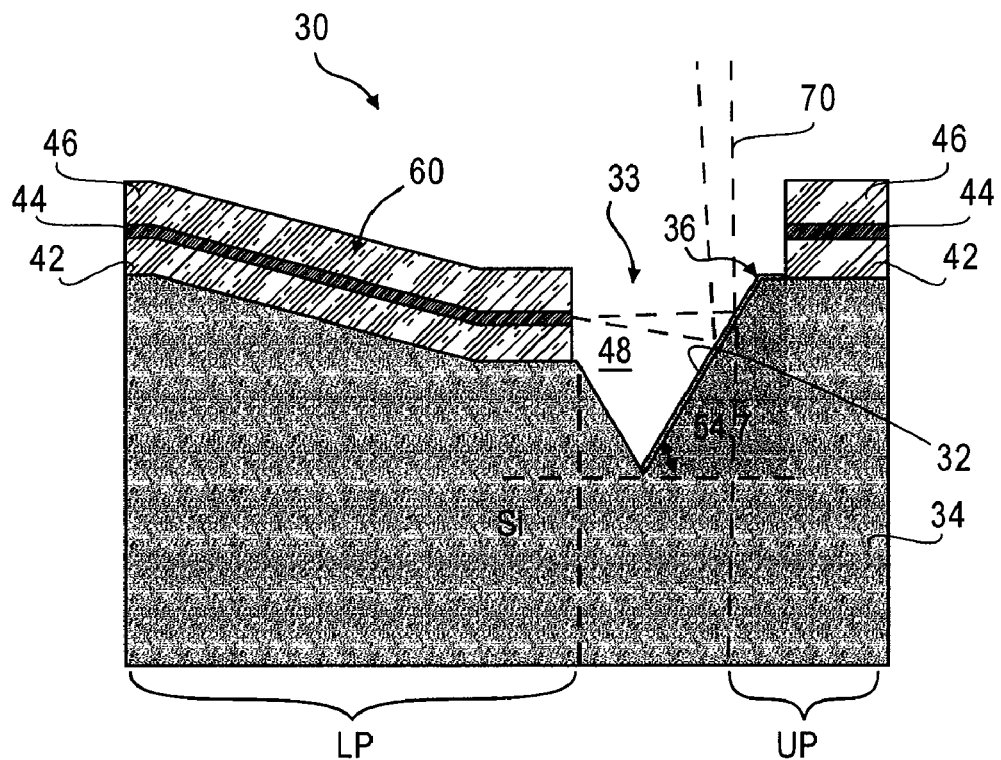

FIG. 10A is a cross-sectional view of a ninth embodiment of the PLC waveguide 30. In this embodiment, the slanted wall 32 is an inner wall of a well 33. Although the well 33 is shown as a V-groove in the figure, this is not a limitation of the invention (e.g., the well could be shaped like a U). The well 33 is preferably formed by etching (e.g., wet etching) the silicon substrate 34, and at least a part of the inner wall of the well 33 makes about a 54.7-degree angle with respect to a horizontal surface, such as the surface of the upper portion UP.

To make this embodiment, the well 33 is formed in the silicon substrate 34, and the lower portion LP of the silicon substrate 34 is etched to form a sloped portion 60. Any suitable silicon process, such as gray tone mask, may be used to form the sloped portion 60. Usually, after the top cladding layer 46 is formed, the top and bottom corners of the reflective layer 36 will be rounded (as shown below in FIG. 12B). As a result, the light 70 does not always strike the reflective layer 36 on its linear area, making light difficult to control. Forming the sloped portion 60 lowers the nonreflective waveguide portion 40 relative to the slanted wall 32 to move the light 70 to a linear area on the reflective layer 36. The bottom cladding layer 42 is formed on the sloped portion 60 of the substrate 34 as well as on the upper portion UP. The bottom cladding layer 42, the core layer 44, and the top cladding layer 46 are formed substantially conformally, then etched from the well 33. Then, the reflective layer 36 is formed on the slanted wall 32 by deposition and etching. The reflective layer 36 is formed on the part of the slanted wall 32 that receives the light exiting from the core layer 44 of the sloped portion 60. The depth by which the nonreflective waveguide portion 40 is etched is controlled to make the waveguide far field mode locate at the linear area of the reflective layer 36. In determining the length of the sloped portion 60, any excess signal loss due to the slope is taken into account.

Figure 10B:
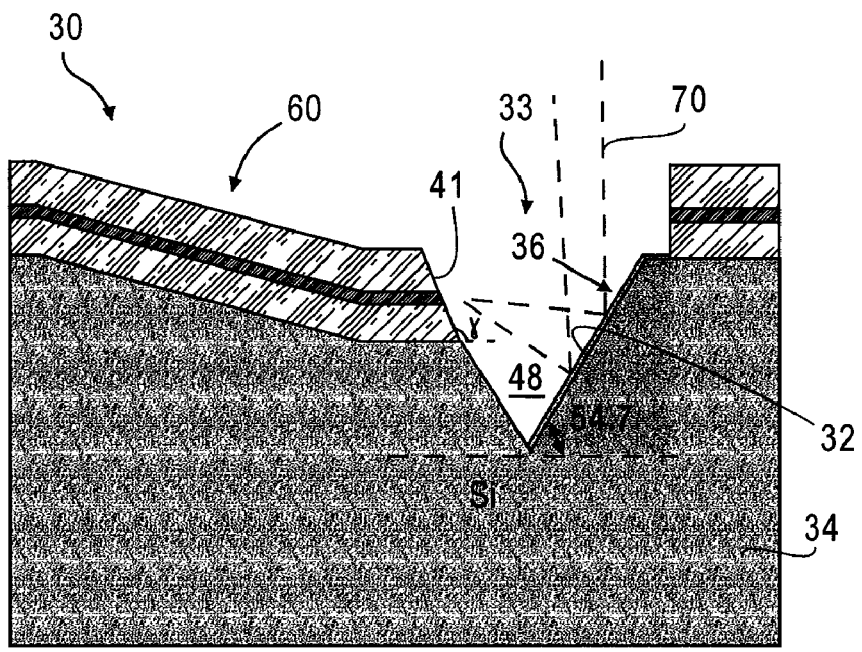

FIG. 10B is a cross-sectional view of a tenth embodiment of the PLC waveguide 30. This embodiment is similar to the embodiment of FIG. 10A, with a primary difference being the angle of the exit facet 41. In the embodiment of FIG. 10A, the nonreflective waveguide portion 40 has an exit facet 41 that forms a right angle with respect to the surface 35 of the silicon substrate 34. In the embodiment of FIG. 10B, the exit facet 41 forms an angle γ that is greater than 90° with respect to a horizontal surface. Method of forming the angle is described above, in reference to FIG. 3. The angle of the exit facet 41 may be changed to control the direction in which light 70 travels after it exits the nonreflective waveguide portion 40, and is useful for controlling the point of incidence on the reflective layer 36.

Figure 11:
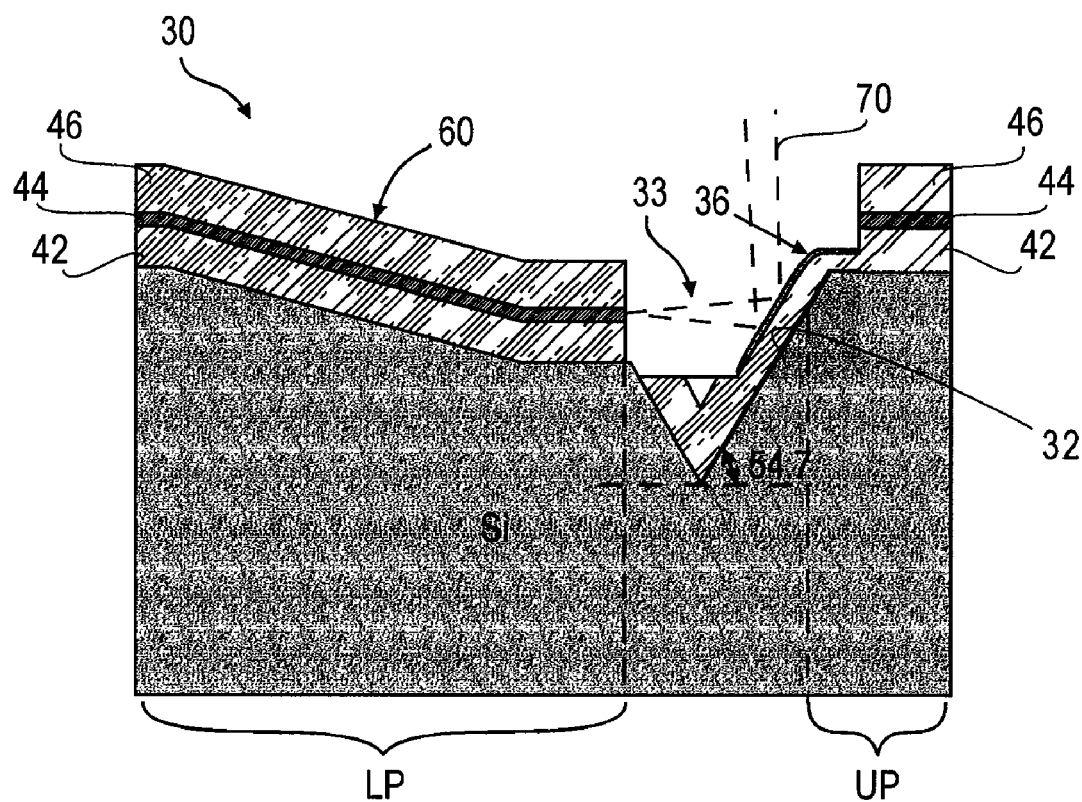

FIG. 11 is a cross-sectional view of a eleventh embodiment of the PLC waveguide 30. This embodiment is similar to the embodiment of FIG. 10A, with a primary difference being an incomplete etching of the bottom cladding layer 42 and possibly also the core layer 44. As shown, some of the bottom cladding layer 42 and the core layer 44 remain in the well 33, and some of the bottom cladding layer 42 remains on the slanted wall 32 and part of the upper portion UP that is adjacent to the well 33. In this structure, enough of the layers formed in the well 33 are removed to create an unobstructed path for light to travel from the sloped portion 70 of the waveguide to the reflective layer 36. The process for making this embodiment is similar to the process that was described above for FIG. 4, with the addition of forming the well 33 and the sloped portion 60.

In the embodiment of FIG. 10A, the angle of the reflective layer 36 is determined by the angle of the slanted wall 32, which has good linearity. In the embodiment of FIG. 11, the reflecting layer 36 is on the partially etched bottom cladding layer 42. Due to the regrowth of silica, the corners of the reflective layer 36 may be rounded. In this case, etch depth is selected to ensure that light will strike the reflective layer 36 on a linear portion.

Figure 12A:
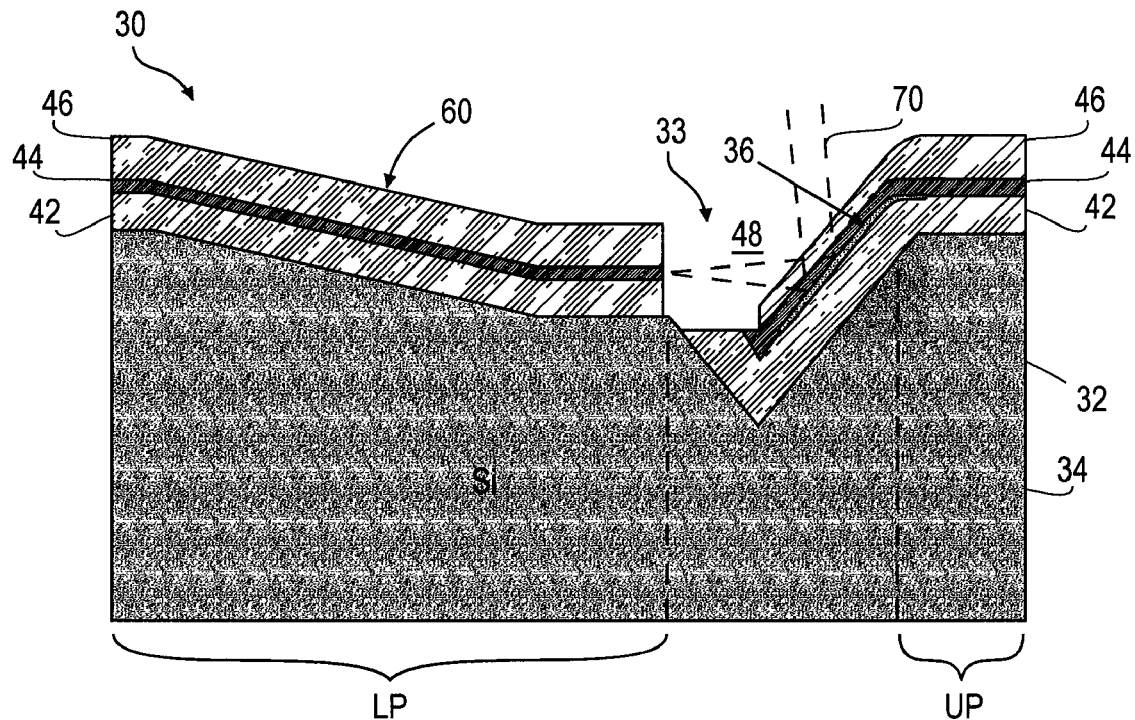

FIG. 12A is a cross-sectional view of a twelfth embodiment of the PLC waveguide 30. This embodiment is similar to the embodiment of FIG. 11, with a primary difference being that the reflective layer 36 is formed between the core layer 44 and the bottom cladding layer 42. The reflective layer 36 being "buried" under the top cladding layer 46 and the core layer 44, it is protected from various environmental elements. The light 70 that exits the tapered portion of the waveguide will travel across the gap 48 and travel through the top cladding layer 46 and the core layer 44 before striking the reflective layer 36 to get reflected in the second (vertical) direction. The process for making this embodiment is similar to the process described above for FIG. 11, except that the reflective layer 36 is formed before the core layer 44 is formed.

Figure 12B:
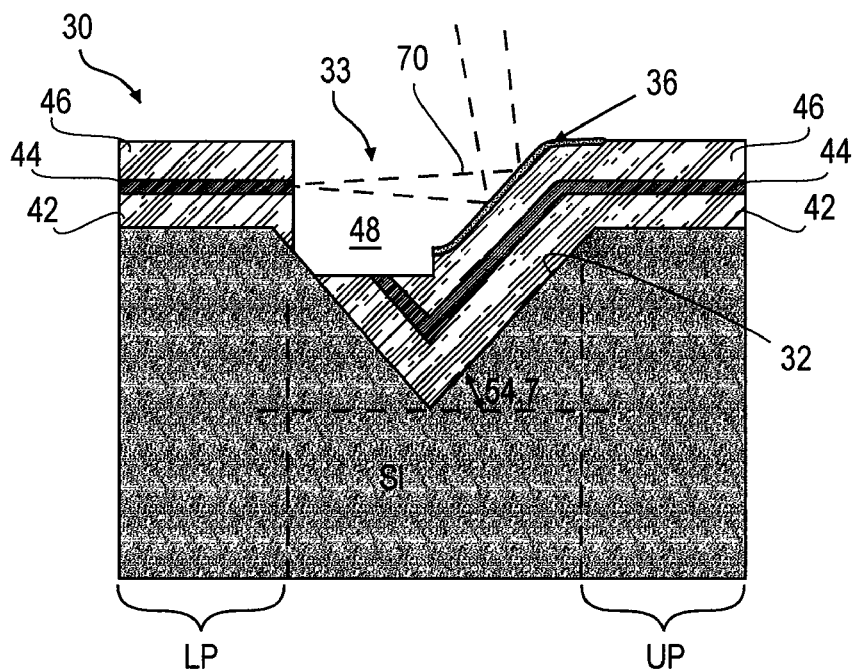

FIG. 12B is a cross-sectional view of a thirteenth embodiment of the PLC waveguide 30. This embodiment is similar to the embodiment of FIG. 12A, with a primary difference being that the reflective layer 36 is on the top cladding layer 46. The process for making this embodiment is similar to the process described above for FIG. 12A, except that the reflective layer 36 is formed after the top cladding layer 46.

Figure 12C:
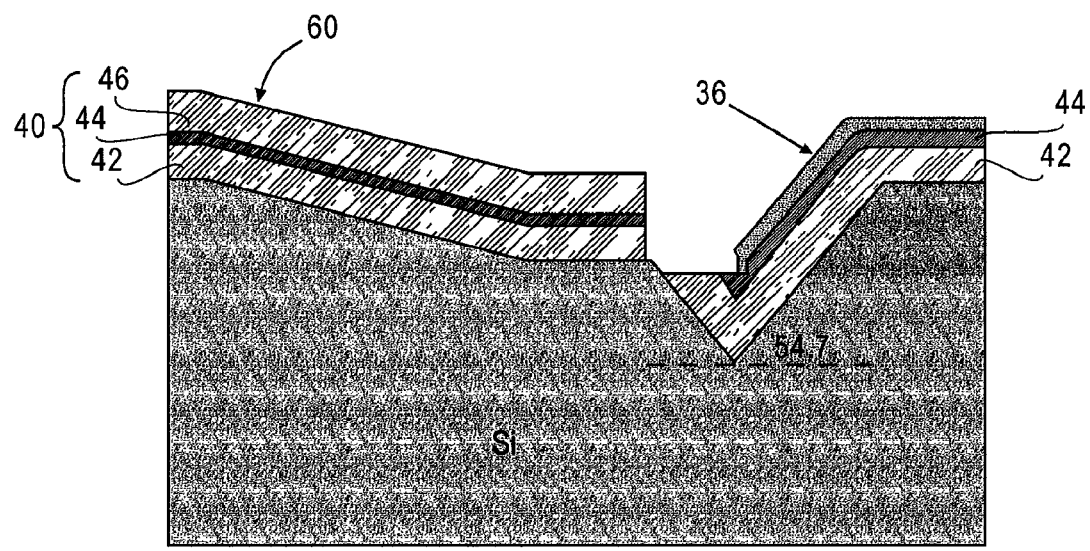

FIG. 12C is a cross-sectional view of a fourteenth embodiment of the PLC waveguide 30. This embodiment is similar to the embodiment of FIG. 12B, with a primary difference being that there is no top cladding layer 46 under the reflective layer 36. The top cladding layer 46 has been selectively removed from parts of the PLC waveguide 30 other than the nonreflective waveguide portion 40.

Figure 13A:
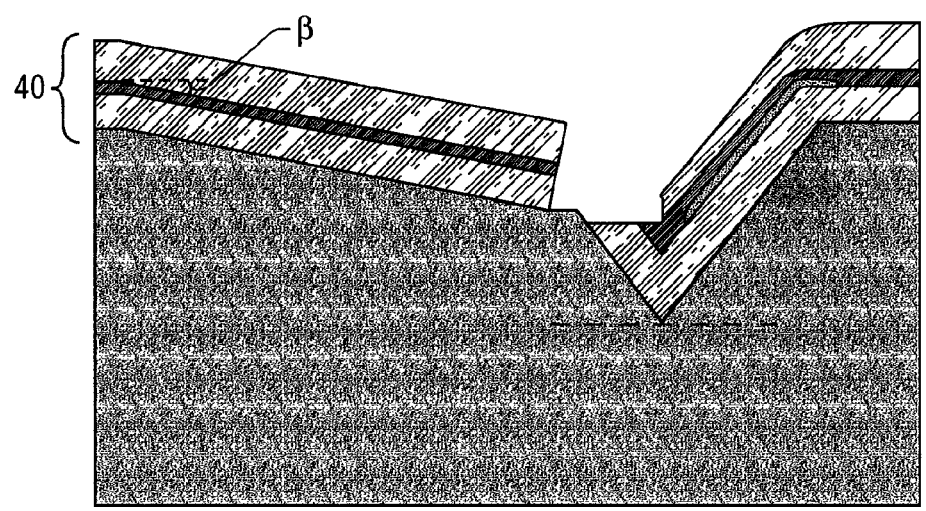
Figure 13B:
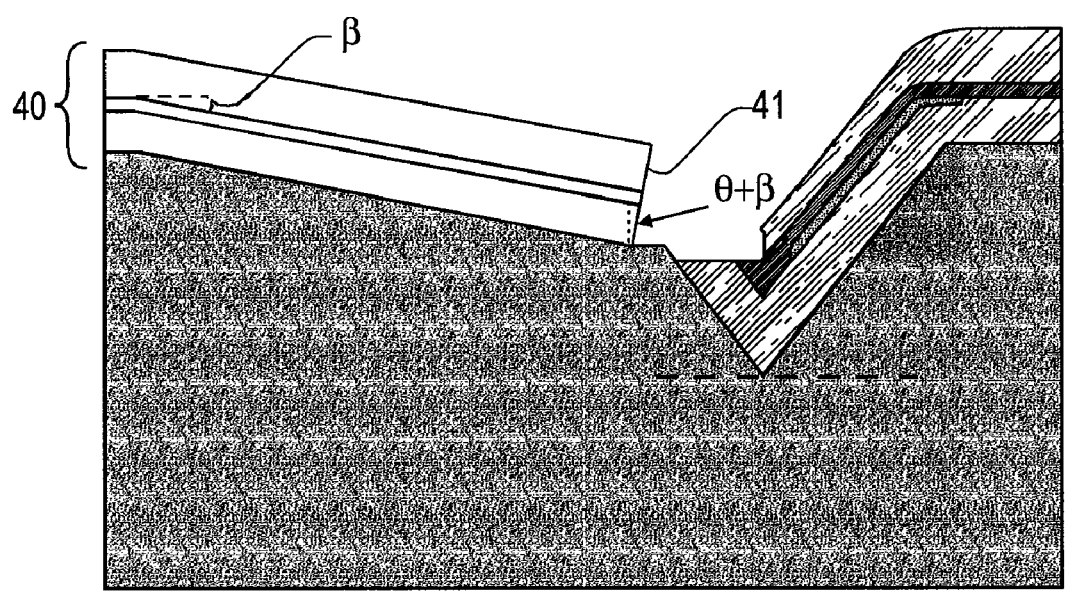

FIG. 13A is a fifteenth embodiment of the PLC waveguide 30. This embodiment is similar to the embodiment of FIG. 12A, with a primary difference being that the nonreflective waveguide portion 40 is slanted such that the exit facet 41 forms an angle θ with respect to a plane that slices the nonreflective waveguide portion 40 at a right angle. With respect to FIG. 13A, the plane would extend into the page and be orthogonal to the lengthwise direction of the nonreflective waveguide portion 40. In addition, the nonreflective waveguide portion 40 itself may be tilted, for example by being formed on the sloped portion 60, such that the lengthwise direction of the nonreflective waveguide portion 40 forms a tilt angle β with respect to an axis that is normal to an edge of the reflective layer 36. Specifically, the embodiment shown in FIGS. 13A and 13B show that the exit facet 41 can be slanted vertically (e.g., downward) to reduce the return loss at the exit facet 41. The formula for determining the tilt angle β is provided below, in reference to the embodiment of FIG. 16A.

Figure 14A:
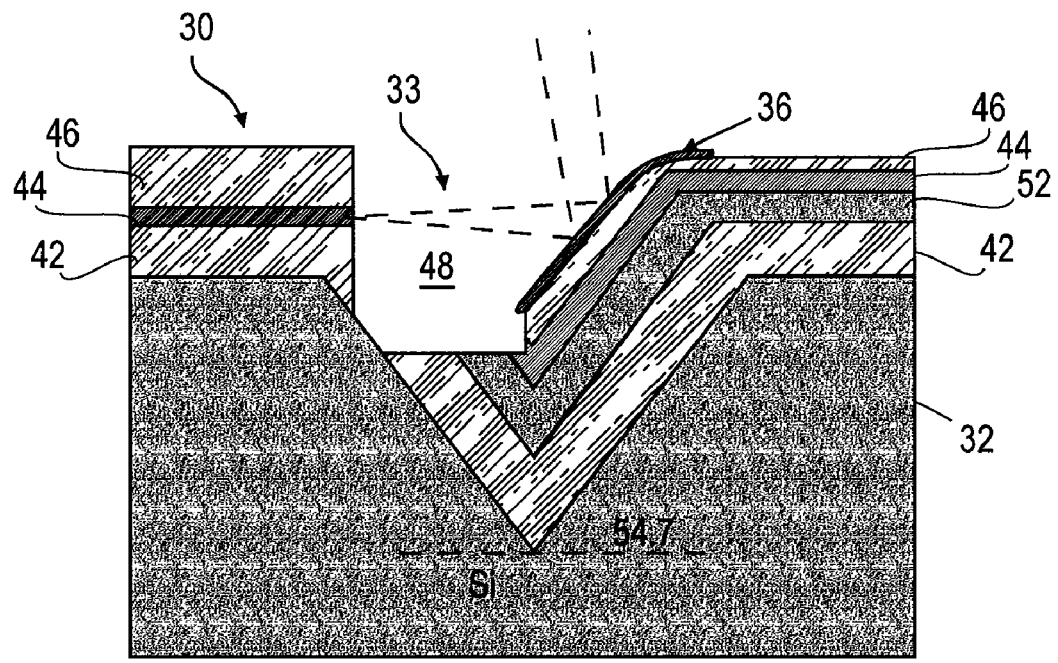
Figure 14B:
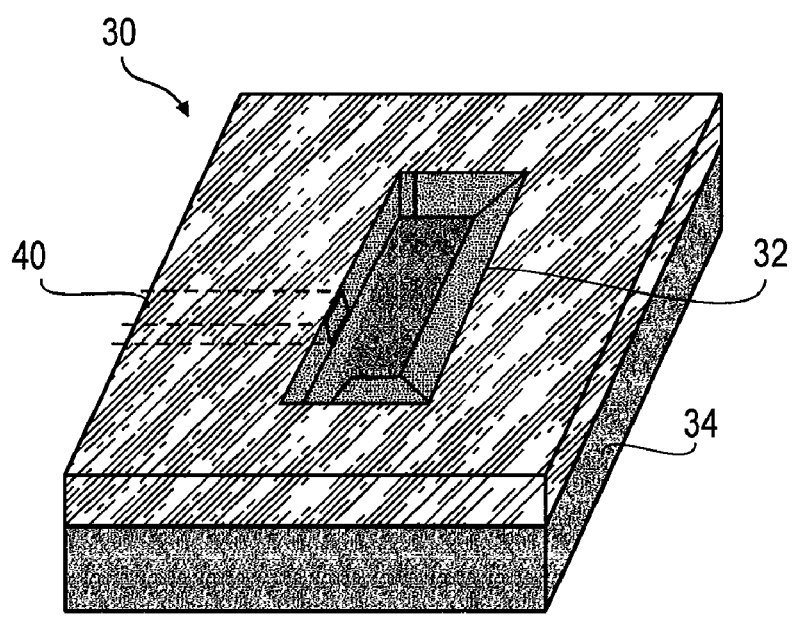

FIG. 14A is a cross-sectional view of a sixteenth embodiment of the PLC waveguide 30. This embodiment is similar to the embodiment of FIG. 12B, with a primary difference being the formation of the α-Si layer 52. The α-Si layer 52 is formed between the bottom cladding layer 42 and the core layer 44. The thickness of the α-Si layer 52 is controlled to ensure that it covers all the far field mode of the PLC waveguide 30 locate at the linear area of the reflective layer 36. FIG. 14B is a perspective view of the embodiment shown in FIG. 14A. As shown, the slanted wall 32 is formed in the inner part of the PLC waveguide 30. In the embodiment of FIG. 14B, the slanted wall 32 extends across the width of the PLC waveguide 30.

Figure 15:
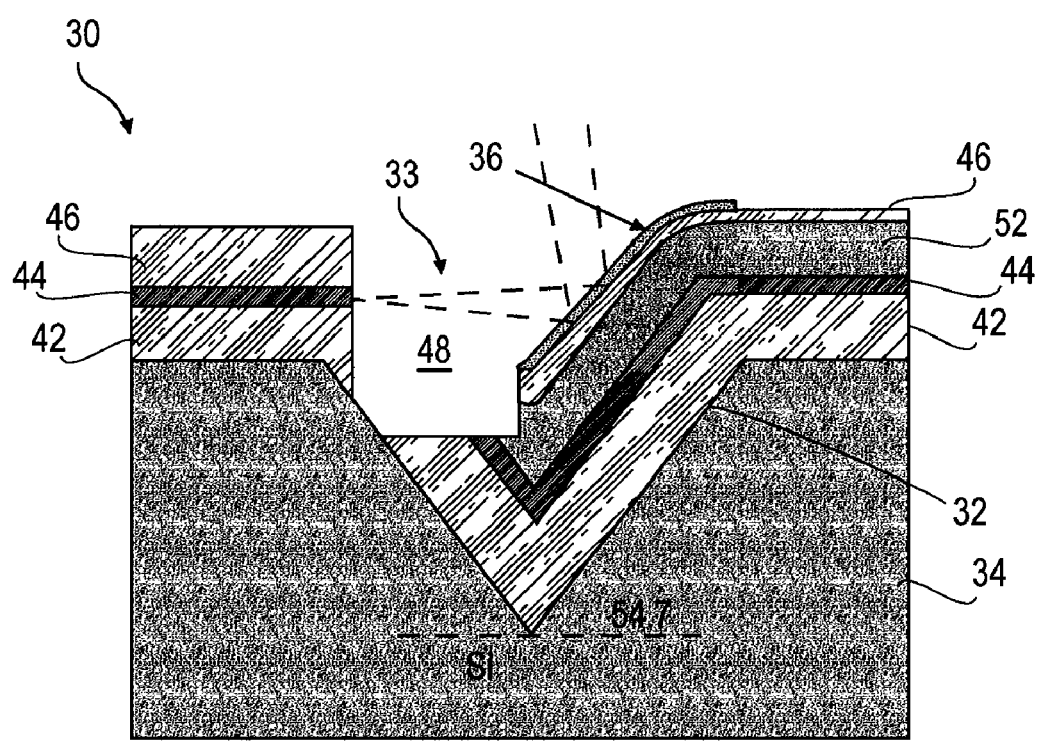

FIG. 15 is a cross-sectional view of a seventeenth embodiment of the PLC waveguide 30. This embodiment is similar to the embodiment of FIG. 14A with a primary difference being the position of the α-Si layer 52. Here, the α-Si layer 52 is formed between the core layer 44 and the top cladding layer 46.

Figure 16A:
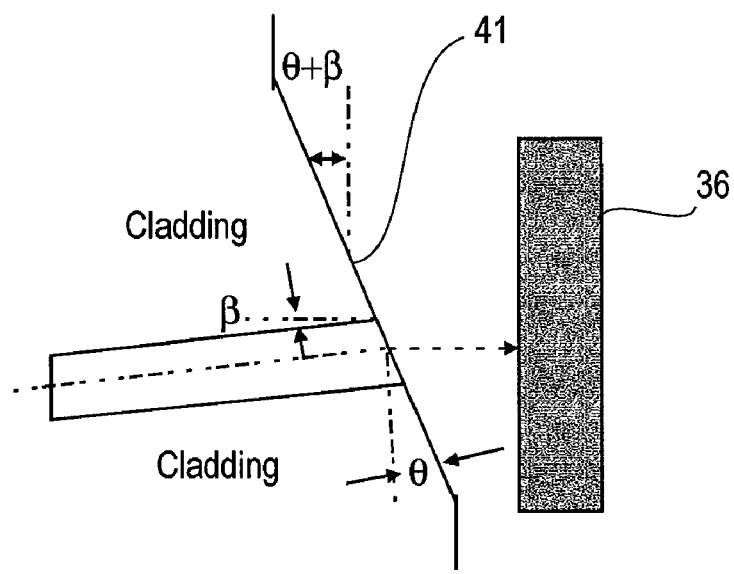
FIG. 16A a top view diagram depicting the position of the nonreflective waveguide portion in the PLC waveguide of the invention.
Figure 16B:
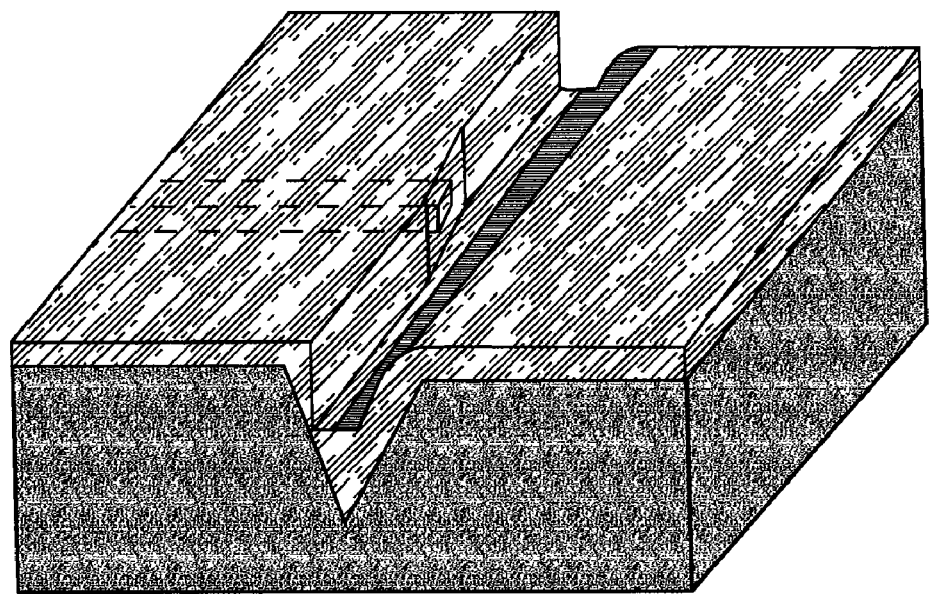
FIGS. 16B and 16C are perspective views of an embodiment of the PLC waveguide of the invention.
Figure 16C:
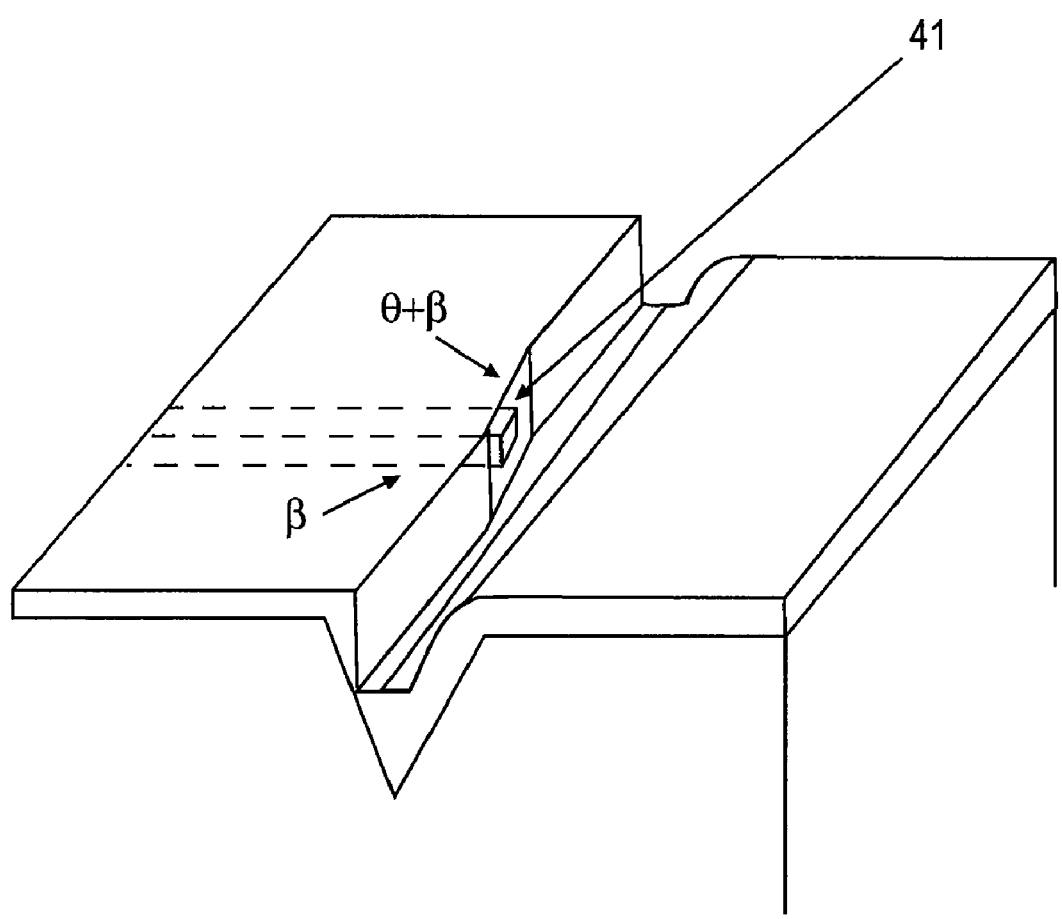

FIG. 16A is a top view diagram depicting the position of the nonreflective waveguide portion 40 in an embodiment of the invention. FIGS. 16B and 16C are perspective views of the PLC waveguide 30 depicting the position of the nonreflective waveguide portion 40. FIGS. 16A, 16B, and 16C show that the exit facet 41 can be slanted horizontally (so that one side of the exit facet 41 is closer to the reflective layer 36 than the other) as well as vertically to reduce the return loss at the exit facet 41. The exit facet 41 is slanted such that it forms an angle θ with respect to a plane that slices the nonreflective waveguide portion 40 at a right angle, orthogonally to the lengthwise direction of the nonreflective waveguide portion 40. In addition, the nonreflective waveguide portion 40 may be tilted such that the lengthwise direction of the nonreflective waveguide portion 40 forms a tilt angle β with respect to an axis that is normal to an edge of the reflective surface 36. The angles θ and β are used to adjust the angle of incidence at the reflective layer 36. For the light 70 to reach the reflective layer 36 at a substantially normal angle, the tilt angle is calculated as follows:

$$\beta = a\sin(n_{eff}\sin(\theta)) - \theta$$

wherein the horizontal tilt angle β indicates the tilt of the nonreflective waveguide portion 40, $n_{eff}$ is the effective index of refraction for the nonreflective waveguide portion 40, and θ indicates the severity by the exit facet 41 is slanted with respect to the rest of the nonreflective waveguide portion 40.

Although the gap 48 is filled with air in the above examples, this is not a limitation of the invention and the gap may be filled with any substance that allows light to travel through it and is different from the material that makes up the nonreflective waveguide portion 40. If the gap 48 were to be filled with a material having an index of refraction $n_{gap}$, the formula for determining the angle β would be adjusted as follows:

$$\beta = a\sin[(n_{eff}/n_{gap})\sin(\theta)] - \theta.$$

Figure 17:
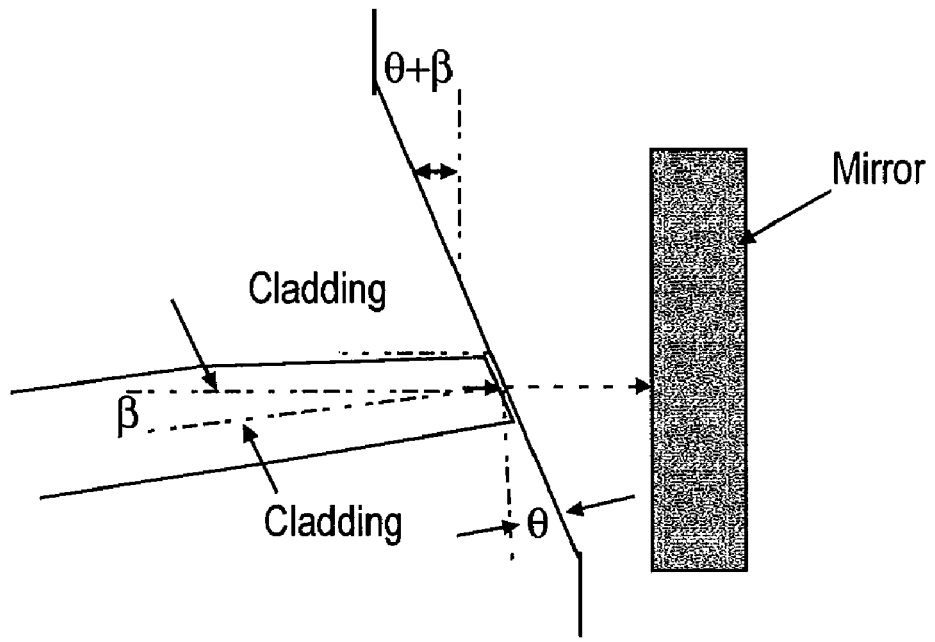
FIGS. 17 and 18 are top view diagrams depicting a tapered shape of the nonreflective waveguide portion in the PLC waveguide of the invention.

FIG. 17 is a top view diagram depicting the shape of the nonreflective waveguide portion 40 in an embodiment of the invention. In the embodiments described above, the width W of the waveguide portion 40 remained substantially constant except where the exit facet 41 slanted. In this embodiment, the nonreflective waveguide portion 40 has a tapered shape when viewed from the top, such that the width decreases as distance to the exit facet 41 decreases. This tapering technique may be used to control the waveguide mode size exiting the exit facet 41, which controls the far field of this mode, and the location and/or direction of the light beam exiting the exit facet 41. In an exemplary embodiment, the width of the straight waveguide is about 3 to about 8 μm and the narrowest portion of the tapered section may be as narrow as 1 μm. This, however, is not a limitation of the invention. Likewise, the taper shape is not limited to the particular one that is shown in the drawings, and may be linear, parabolic, exponential, etc.

Figure 18:
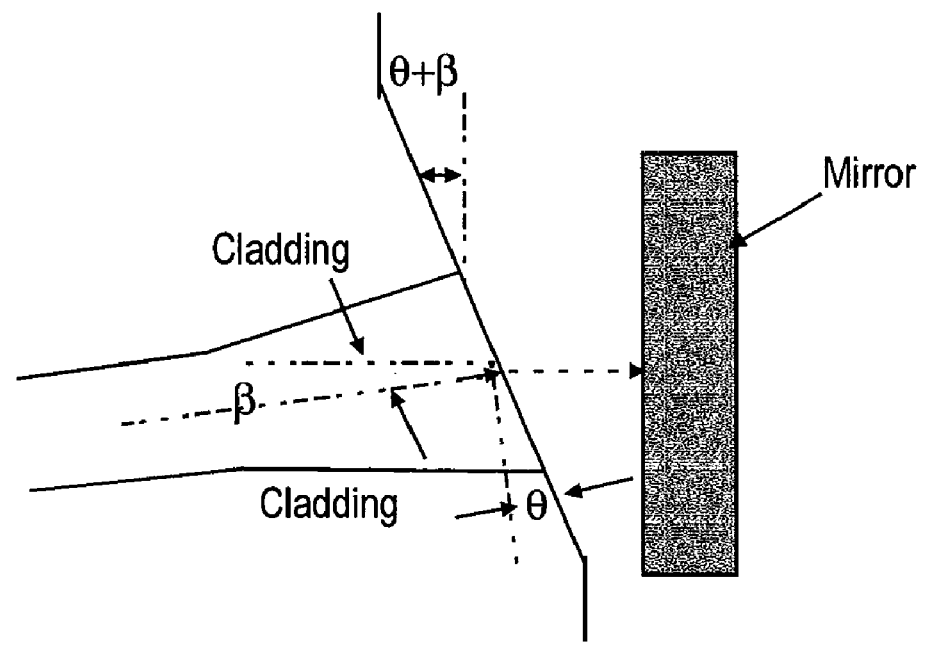

FIG. 18 is a top view diagram depicting the shape of the nonreflective waveguide portion 40 in another embodiment of the invention. This embodiment is similar to the embodiment of FIG. 17 except that the width of the nonreflective waveguide portion 41 increases as distance to the exit facet 41 decreases. The widest section of the tapered part of the nonreflective waveguide portion 40 may be as wide as about 12 μm. Between the embodiments of FIG. 17 and FIG. 18, the untapered part of the nonreflective waveguide portion 40 may be about 3-8 μm, and the tapered part may be about 1-12 μm, depending on the silica waveguide core design. These dimensions are not limitations of the invention but a description of an exemplary embodiment. Dimensions of the device may vary a lot depending on the waveguide index difference. Further, although FIG. 17 and FIG. 18 each shows a horizontally slanted exit facet 41, the tapered design of the nonreflective waveguide portion 40 is not limited to being used with a slanted exit facet 41. Furthermore, the tapered design of the nonreflective waveguide portion 40 may be used with a PLC waveguide design of FIG. 8 or 9.

The device and method described herein have advantages over some of the existing devices and methods for integration of silica-based PLC and III-V-based active device. One of the existing methods of achieving this integration entails forming a mirror in a groove by using wettability control and surface tension effect. However, as mentioned above, the end device made with this method has termination grooves and a long resin supply groove extending to the edge of the chip. In contrast, the device of the invention has just a localized groove, resulting in a simplified design.

Another existing method for integration of silica-based PLC and III-V-based active device entails creating a superficial layer by bombarding a silica surface with oxygen ions. With this method, the end device has a mirror fabricated in the waveguide core layer. This means the mirror covers only a small part of the waveguide, reflecting only part of the waveguide mode. The device of the invention allows greater flexibility by making it possible to form the reflective layer on the bottom cladding layer or the top cladding layer as well as the core layer. Since the reflective layer can be formed on more than one of these layers, the mirror size can be increased as well to improve the reflection efficiency. Further, in the embodiments that have a gap between the waveguide (the non-reflective waveguide) and the reflective layer, the exit facet on the waveguide can be adjusted to achieve an even higher reflection efficiency.

Another limitation of this second existing integration method is that it is only usable with silica waveguides. The general sequence for this second existing method is as follows: 1) deposit the waveguide bottom cladding layer and/or the core layer, 2) selectively ion-bomb certain parts of the deposited layer, 3) etch the deposited waveguide layers to form a slant, then 4) deposit the reflective layer and the top cladding layer. The substrate itself is not etched with this existing method. In the method of the invention, the slanted wall is formed by etching the silicon substrate, not just the waveguide layer(s). Hence, the etching of the silicon substrate is generally performed before the conformal deposition of the waveguide layers and the reflective layer. Hence, unlike the existing method, the method of the invention can be used with any waveguide material other than silica as long as the waveguide material can be conformally deposited or otherwise formed to a fairly uniform thickness.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the invention.

While the invention has been described in terms of particular embodiments and illustrative figures, those of ordinary skill in the art will recognize that the invention is not limited to the embodiments or figures described. In many of the embodiments described above, the various features can be mixed differently. For example, the position of the reflective layer 36 in FIGS. 14 and 15 may be changed so that the reflective layer 36 is "buried" as in FIG. 12A. A person of ordinary skill in the art will appreciate, too, that most of the layers shown here may be deposited or thermally grown.

Although the invention is herein described with a focus on integrating PLC with photodiode devices, the invention may be adapted for integrating PLC and surface-emitting devices, such as laser (for PLC-VCSEL integration). Furthermore, while the invention is herein described in the context of silica-on-silicon-based PLC, the structure and method disclosed herein may be applied to other silicon-based PLCs where the waveguide bottom cladding, core, and top cladding can be formed on the substrate conformally.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of making a planar lightwave circuit (PLC) waveguide capable of being integrated with a surface-mounted component, the method comprising:
    etching a silicon substrate to form a slanted wall;
    forming a nonreflective waveguide portion on the silicon substrate, wherein light travels through the nonreflective waveguide portion in substantially a first direction;
    depositing a reflective layer on the slanted wall so that the light from the nonreflective waveguide portion strikes the reflective layer to be redirected in a second direction;
    wherein the nonreflective waveguide portion has an exit face that is spaced apart from the slanted wall by a gap, and wherein the light coming out of the exit facet travels across the gap in a first direction before striking the reflective layer, the gap being filled with a material having a different index of refraction from the nonreflective waveguide portion.

2. The method of claim 1, wherein the reflective layer forms an angle of between about 20° and about 70° with respect to a surface of the silicon substrate, and wherein the second direction is substantially perpendicular to the first direction.

3. The method of claim 1, wherein forming the slanted wall comprises wet etching the silicon substrate.

4. The method of claim 1, wherein forming the nonreflective waveguide portion comprises:
    forming a bottom cladding layer;
    removing a part of the bottom cladding layer;
    forming a core layer;
    removing a part of the core layer;
    forming a top cladding layer; and
    removing a part of the top cladding layer.

5. The method of claim 4, wherein the forming of the bottom cladding layer, the core layer, and the top cladding layer is completed prior to the removing of one or more of the bottom cladding layer, the core layer, and the top cladding layer.

6. The method of claim 4, wherein the removing of the core layer and the top cladding layer comprises completely removing the core layer and the top cladding layer from the slanted wall while removing of the bottom cladding layer comprises leaving a layer of bottom cladding layer on the slanted wall.

7. The method of claim 4, wherein the reflective layer is formed directly on either the bottom cladding layer or the top cladding layer.

8. The method of claim 7 further comprising forming the reflective layer after forming the top cladding layer, such that the cladding layer is the top cladding layer and the reflective layer is formed directly on the top cladding layer.

9. The method of claim 7, wherein the cladding layer is the bottom cladding layer, further comprising forming the reflective layer directly on the bottom cladding layer.

10. The method of claim 7 further comprising forming the reflective layer between the top cladding layer and the bottom cladding layer.

11. The method of claim 4, wherein the reflective layer is formed on top of the core layer.

12. The method of claim 4 further comprising forming the reflective layer under either the bottom cladding layer or the top cladding layer.

13. The method of claim 4, wherein the bottom cladding layer, the core layer, and the top cladding layer are completely removed from the slanted wall before the forming of reflective layer, such that the reflective layer is formed directly on the slanted wall.

14. The method of claim 4 further comprising:
    forming a temporary layer on the slanted wall before forming the bottom cladding layer and the core layer; and
    removing the temporary layer before forming the top cladding layer.

15. The method of claim 14 further comprising forming an α-Si layer on the slanted wall after forming the temporary layer.

16. The method of claim 14 further comprising forming a SiN layer on the slanted wall after forming the temporary layer.

17. The method of claim 1 further comprising forming an α-Si layer on the silicon substrate.

18. The method of claim 15, wherein the α-Si layer is formed directly on the slanted wall.

19. The method of claim 17, wherein the α-Si layer is formed directly on the bottom cladding layer.

20. The method of claim 17, wherein the α-Si layer is formed directly on the core layer.

21. The method of claim 17, wherein the reflective layer is formed directly on the α-Si layer.

22. The method of claim 1 further comprising forming a SiN layer on the silicon substrate.

23. The method of claim 22, wherein the SiN layer is formed directly on the slanted wall.

24. The method of claim 22, wherein the SiN layer is formed directly on the bottom cladding layer.

25. The method of claim 22, wherein the SiN layer is formed directly on the core layer.

26. The method of claim 22, wherein the reflective layer is formed directly on the SiN layer.

27. The method of claim 1, wherein forming the nonreflective waveguide portion comprises:
    forming a bottom cladding layer;
    forming a core layer; and
    forming a top cladding layer, wherein the thickness of each of the bottom cladding layer, the core layer, and the top cladding layer is substantially constant.

28. The method of claim 1, wherein forming the nonreflective waveguide portion comprises:
    forming a bottom cladding layer;
    forming a core layer; and
    forming a top cladding layer such that the portion of the top cladding layer that is on the slanted wall is substantially flat.

29. The method of claim 1 further comprising adjusting an angle of the exit facet to control the angle of incidence at the reflective layer.

30. The method of claim 29, wherein adjusting the angle comprises slanting the exit facet such that the exit facet forms a slant angle θ with respect to a plane that is orthogonal to a lengthwise direction of the nonreflective waveguide portion.

31. The method of claim 30, wherein the nonreflective waveguide portion is tilted such that a lengthwise direction of the nonreflective waveguide portion forms a tilt angle β with respect to an axis that is orthogonal to an edge of the reflective layer, wherein $\beta = a\sin(n_{\mathit{eff}} \sin(\theta)) - \theta$, $n_{\mathit{eff}}$ being the effective index of the nonreflective waveguide portion.

32. The method of claim 30 further comprising filling the gap with a material having an index $n_{gap}$.

33. The method of claim 32, wherein the adjusting comprises tilting the nonreflective waveguide portion such that a lengthwise direction of the nonreflective waveguide portion forms a tilt angle β with respect to an axis that is orthogonal to an edge of the reflective layer, wherein $\beta = a\sin[(n_{eff}/n_{gap})\sin(\theta)] - \theta$, $n_{eff}$ being the effective index of the nonreflective waveguide portion.

34. The method of claim 1 further comprising adjusting the relative positions of the exit facet and the reflective layer such that the light coming out of the exit facet strikes a flat portion of the reflecting surface at a substantially normal angle.

35. The method of claim 1 further comprising tapering the nonreflective waveguide portion such that its width decreases as distance to the exit facet decreases.

36. The method of claim 1 further comprising tapering the nonreflective waveguide portion such that its width increases as distance to the exit facet decreases.

37. The method of claim 1 further comprising varying a width of the nonreflective waveguide portion such that a first end of the nonreflective waveguide portion has a different width than a second end of the nonreflective waveguide portion.

38. The method of claim 1, wherein forming the slanted wall comprises forming a well in the silicon substrate, the slanted wall being a sidewall of the well.

39. The method of claim 38, wherein one side of the well is higher than the other and the reflective layer is formed on the higher slanted wall.

40. The method of claim 38, wherein the well is a V-groove.

41. The method of claim 38, wherein the well is a U shape groove.

42. The method of claim 38, wherein forming the nonreflective waveguide portion comprises:
   forming a bottom cladding layer;
   removing a part of the bottom cladding layer;
   forming a core layer;
   removing a part of the core layer;
   forming a top cladding layer; and
   removing a part of the top cladding layer.

43. The method of claim 42 further comprising completely removing the bottom cladding layer, the core layer, and the top cladding layer from the well.

44. The method of claim 42 further comprising:
   forming the bottom cladding layer, the core layer, and the top cladding layer on the silicon substrate and in the well; and
   removing a portion of the formed layers from an area in the well to create an exit facet of the nonreflective waveguide portion and a gap between the exit facet and the slanted wall.

45. The method of claim 1 further comprising forming a sloped portion on a part of the silicon substrate on which the nonreflective waveguide portion is formed.

46. The method of claim 45 wherein the sloped portion is on a part of the silicon substrate across the well from the slanted wall.

47. The method of claim 45, wherein one side of the well is higher than the other and the reflective layer is formed on the higher slanted wall.

48. The method of claim 45 further comprising forming the bottom cladding layer, core layer and the top cladding layer in the well to form the nonreflective waveguide.

49. The method of claim 45, wherein the sloped portion becomes closer to the substrate as it extends toward the slanted wall.

* * * * *